United States Patent Office 3,398,737
Patented Aug. 27, 1968

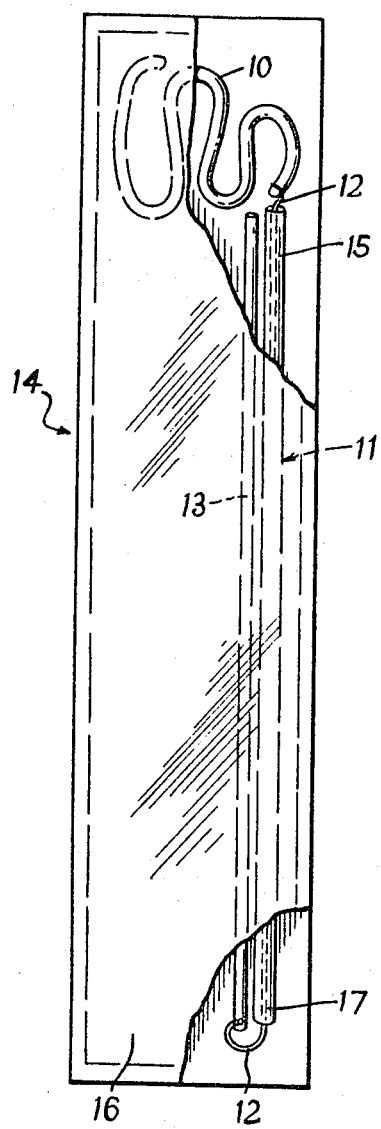

3,398,737
INTRAUTERINE CONTRACEPTIVES
Hylton F. G. Sheppard, 93 Harley St., London, England, and Leonard R. Cook, Pied Pipers, Alcocks Lane, Tadworth, Surrey, England
Filed Oct. 18, 1965, Ser. No. 496,891
Claims priority, application Great Britain, Oct. 7, 1965, 42,647/65
7 Claims. (Cl. 128—130)

ABSTRACT OF THE DISCLOSURE

A sterile contraceptive package is disclosed in which a coiled intrauterine device has a strand or tail which passes through a tubular introducer for the device and is attached to a plunger for expelling the device into the uterus. The items are so disposed within the package that the device can be drawn into the tube and the plunger inserted ready for use without exposing the operative parts of the combination to nonsterile conditions.

The present invention relates to intrauterine contraceptive devices.

Several forms of intrauterine device made of molded synthetic resin have been developed in recent years, notably the Margulies spiral and the Lippes loop. These devices are inserted in an elongated condition into a tubular introducer or cannula, which can itself be introduced through the cervix whereupon the device can be expelled into the uterus to resume its normal curled conformation.

It is important that any object introduced into the vaginal should be sterile, if infection is to be avoided, and the introducers are commonly made of polyetrafluoroethylene in order that they can be sterilized by boiling. This makes these items relatively costly. Sterilization of the synthetic devices themselves presents greater problems since the resins which have suitable mechanical properties do not withstand the temperatures necessary for heat sterilization. A further difficulty arises at the insertion of the device into a cannula, which requires delicate manpulation and brings further risk of contamination of the articles being handled.

The invention seeks to overcome these disadvantages and to provide a sterile assembly which is relatively cheap to produce and which can be used with greater ease or with less risk of infection than the items currently being produced.

According to a first aspect of the invention, a sterile pack is prepared by placing an intrauterine contraceptive device of synthetic resin and an introducer of synthetic resin therefor in a heat sealable envelope, sealing the articles therein and exposing the sealed package to an atmosphere containing one part of a gaseous alkyline oxide or alkylene imide in admixture with from 9 to 25 parts of an indifferent gas at a pressure of from 3 to 6 atmospheres and a temperature below that at which the properties or conformation of the device or introducer are affected.

The invention thus provides a sterile pack comprising an envelope sealed against the ingress of microorganisms and containing a sterile intrauterine contraceptive device of synthetic resin and a sterile introducer of synthetic resin therefor. The pack can be cheaply prepared and easily and conveniently stored. Moreover, since sterilization can be carried out at relatively low temperatures, for example within the range 20–60° C., both the device and the introducer can be formed of a cheap synthetic resin, with consequent economies in production. The pack can be readily opened for use when required.

Any envelope which is impervious to microorganisms but permeable by a bacteriocidal gas may be used, but the preferred material is thermoplastic film, for example 300-polyethylene.

The preferred conditions for sterilization are 15% ethylene oxide and 85% carbon dioxide, at 5.5 atmospheres, 80% relative humidity and 60° C.

According to a second aspect of the invention there is provided an assembly comprising an intrauterine device, a hollow tubular introducer or cannula therefor and a thread attached to that portion of the device which is to be first inserted in the introducer or cannula and passing through the introducer or cannula so that its free end is accessible. With this assembly, the device can be drawn into the introducer or cannula by drawing on the thread.

With an assembly as thus defined, the difficult and potentially infective manipulation of inserting the device in the introducer is replaced by the simple expedient of drawing on a thread. Cotton and nylon thread, and fine wire are all effective. Alternatively, the thread may consist of catgut or other material which is dissolved by normal body processes. The thread may be tied or twisted round or otherwise secured to the appropriate part of the device and the free end of the thread is advantageously wound round the outside of lower end of the introducer or attached to the plunger of the introducer to prevent it from becoming lost inside the introducer during storage or transport. When the device is fully inserted in the introducer, the thread can easily be untwisted or cut from the device.

Where the device in question is a Margulies spiral with a beaded follower, the thread can conveniently be tied round the follower behind the last bead, and can be removed after insertion of the spiral into the introducer, by cutting the follower above the last bead, which is not necessary for satisfactory functioning of the device. Where the device is a Lippes loop, the thread may take the form of at least one physiologically inert strand, for example a pair of nylon strands of the same type as but longer than those conventionally provided on the loop, and when the device is in position inside the introducer the strand or strands are cut to leave the desired length of strand still attached to the loop.

The two aspect of the invention are preferably used in combination.

One example of an embodiment incorporating both espects of the invention is illustrated in the accompanying drawing, and will now be described. A Lippes loop 10 and tubular introducer or cannula 11, with a pair of nylon strands 12 attached to the tail end of the loop, and passing through the introducer tube and secured to one end of the associated plunger rod 13, are placed in an envelope 14, for example of transparent plastic film, with the loop 10 adjacent to the leading end 15 of the tube and the plunger 13 lying alongside the tube. The tube is preferably of length equal to the sum of the extended length of the loop 10 and the desired length of strand 12 to be dependent from it in use. The envelope is then heat-sealed by conventional techniques and sterilized as indicated above.

When required for use, the pack is opened by cutting a portion 16 of the envelope in the vicinity of the lower end 17 of the introducer, the lower end of the latter is gripped and the end of the plunger 13 to which the strands are attached is drawn out to bring the device 10 into the introducer. The loop and the remainder of the plunger and introducer are preferably not removed from the sterile envelope at this stage.

When the loop 10 has been drawn just fully into the tube 11, the pair of strands 12 is cut off where they emerge from the lower end of the tube, thereby ensuring that the desired length remains attached to the loop to serve as a follower in use. The plunger 13 is then taken, by the end to which the unwanted portions of the strands 12 are still attached, and its free end, which has preferably been hitherto protected by the envelope 14, is inserted into the tube. At this stage, the loaded introducer, gripped at its lower end only, can be wholly withdrawn from the sterile envelope for immediate use.

When the envelope 14 is cut and the contents withdrawn, they may come into contact with the unsterilized external surface of the envelope. This can be avoided if the device, introducer, plunger and the associated thread are first sealed with a bacteriological seal inside a paper envelope, which is subsequently sealed inside a plastic envelope, for example of 300-polyethylene, before cold sterilization. In use, the plastic envelope is first cut and the paper envelope at least partially withdrawn. The paper envelope is then cut to reveal the end of the plunger and the loading procedure continues as before. It will be seen that when the contents of the paper envelope are withdrawn they will only come into contact with a sterilized surface. The paper envelope is not shown in the drawing in the interests of clarity.

While a preferred embodiment of the invention has been illustrated and described, it will be understood that the invention may be embodied in a wide variety of constructions and procedures, all falling within the spirit and scope of the invention as defined in the appended claims.

What is claimed is:

1. A sterile package for contraceptive purposes comprising:
    a resilient coiled intrauterine contraceptive device having attached thereto at least one physiologically inert strand;
    a tube having two open ends for the introduction of said device in elongated condition into the uterus, one end of said tube being disposed adjacent the point of attachment of said strand to said device, and said strand passing through said tube, whereby said device can be drawn into said tube by drawing on said strand;
    a plunger rod adapted to be inserted in said tube to expel therefrom said device when contained therein;
    and a sealed envelope of material impervious to micro-organisms enclosing said device, tube, plunger and strand, in the said dispositions, the interior of said envelope and the contents thereof being substantially sterile.

2. A package according to claim 1 wherein the free end of said strand is attached to one end of said rod, whereby said device can be drawn into said tube by drawing on said rod.

3. A package according to claim 2 wherein the length of said tube is equal to the sum of the extended length of said device and the length of strand required to form a follower for said device when in position in the uterus.

4. A package according to claim 1 wherein said envelope is composed of thermoplastic film material impervious to micro-organisms, and at least said device, tube and plunger are of heat-sensitive material, the interior of said envelope and the contents thereof being sterile.

5. A package according to claim 4 and further comprising a sterile paper envelope sealed with a bacteriological seal, said paper envelope enclosing said device, tube, thread and plunger and being itself enclosed by said first-mentioned film envelope.

6. A method of preparing a sterile contraceptive assembly ready for use which comprises the steps of:
    providing a resilient coiled intrauterine contraceptive device;
    attaching a least one strand of physiologically inert material to said device;
    providing a hollow tubular introducer having two open ends and a plunger for such tube;
    passing the free end of said strand through said introducer from one open end to the other thereof;
    disposing said one end of said device adjacent said one end of said introducer;
    enclosing said device, introducer, plunger and strand in an envelope of material impervious to micro-organisms;
    sealing said envelope;
    sterilizing said sealed envelope;
    drawing on said strand while resisting movement of said introducer until said device has just fully entered said introducer;
    cutting said strand outside said introducer to leave therein said device with the required length of strand attached; and
    introducing the free end of said plunger into the end of said introducer nearest said strand.

7. A method according to claim 6 including the additional steps of securing the free end of said strand to one end of said plunger prior to sealing said envelope;
    opening said sealed and sterilized envelope in a region thereof remote from said device; and
    drawing on said plunger thereby to draw said device into said introducer, said device and introducer being retained wholly within said envelope.

References Cited

UNITED STATES PATENTS

| | | | |
|---|---|---|---|
| 2,922,422 | 1/1960 | Bletzinger | 128—263 |
| 3,035,691 | 5/1962 | Rasmussen et al. | 206—63.2 |
| 3,250,271 | 5/1966 | Lippes | 128—130 |

FOREIGN PATENTS

| | | |
|---|---|---|
| 700,840 | 12/1964 | Canada. |

ADELE M. EAGER, *Primary Examiner.*